United States Patent
VanDuyn et al.

(10) Patent No.: US 9,542,007 B2
(45) Date of Patent: Jan. 10, 2017

(54) SYSTEMS AND METHODS FOR DUAL USE REMOTE-CONTROL DEVICES

(75) Inventors: Luke VanDuyn, Highlands Ranch, CO (US); Neil Marten, Denver, CO (US); Nathan Hale, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 967 days.

(21) Appl. No.: 12/835,403

(22) Filed: Jul. 13, 2010

(65) Prior Publication Data

US 2012/0013536 A1    Jan. 19, 2012

(51) Int. Cl.
| | | |
|---|---|---|
| G06F 3/02 | (2006.01) | |
| G06F 3/023 | (2006.01) | |
| G06F 3/03 | (2006.01) | |
| G06F 3/0354 | (2013.01) | |
| G06F 3/042 | (2006.01) | |
| H04N 5/445 | (2011.01) | |
| H04N 21/422 | (2011.01) | |
| H04N 21/4782 | (2011.01) | |

(52) U.S. Cl.
CPC ........... *G06F 3/0231* (2013.01); *G06F 3/0219* (2013.01); *G06F 3/0317* (2013.01); *G06F 3/03547* (2013.01); *G06F 3/042* (2013.01); *H04N 5/44582* (2013.01); *H04N 21/42214* (2013.01); *H04N 21/4782* (2013.01)

(58) Field of Classification Search
CPC ............ G08C 2201/32; G08C 2201/93; H04N 5/4403; H04N 21/42222; H04N 2005/4428; H04N 21/42224
USPC .................................................. 345/156–178
See application file for complete search history.

(56) References Cited

U.S. PATENT DOCUMENTS

| | | | | |
|---|---|---|---|---|
| 5,063,289 A | * | 11/1991 | Jasinski et al. | ............... 250/221 |
| D331,760 S | | 12/1992 | Renk, Jr. | |
| D342,259 S | | 12/1993 | Darbee et al. | |
| D361,058 S | | 8/1995 | Domel et al. | |
| 5,457,479 A | * | 10/1995 | Cheng | ........................... 345/163 |
| D366,043 S | | 1/1996 | Hara et al. | |
| D366,044 S | | 1/1996 | Hara et al. | |
| D389,838 S | | 1/1998 | Brunner et al. | |
| 5,726,684 A | * | 3/1998 | Blankenship et al. | ........ 345/167 |

(Continued)

OTHER PUBLICATIONS

PCT/US2011/043870 International Search Report and Written Opinion of the International Search Authority mailed Feb. 21, 2012, 7 pages.

(Continued)

*Primary Examiner* — Thuy Pardo
(74) *Attorney, Agent, or Firm* — SEED IP Law Group LLP

(57) ABSTRACT

Various embodiments provide a dual use remote-control device. In one embodiment, a dual use remote-control device may include a first set of input controls such as buttons positioned on a top side of the housing, a second set of input controls positioned on a bottom side of the housing including a QWERTY keyboard and an optical sensor to remotely control movement of a cursor on a display by the optical sensor detecting movement of a user's finger across the optical sensor or movement of the optical sensor across an object such as a table, arm of a chair or user's lap. This abstract is provided to comply with rules requiring an abstract, and it is submitted with the intention that it will not be used to interpret or limit the scope or meaning of the claims.

8 Claims, 10 Drawing Sheets

(56) References Cited

U.S. PATENT DOCUMENTS

| | | | |
|---|---|---|---|
| D418,820 S | 1/2000 | Shintani et al. | |
| 6,094,156 A | 7/2000 | Henty | |
| D477,590 S | 7/2003 | Ahn | |
| D504,886 S | 5/2005 | Yasutomi | |
| D532,777 S | 11/2006 | Yu et al. | |
| D543,971 S | 6/2007 | d'Hoore | |
| D549,666 S | 8/2007 | Tan et al. | |
| D551,659 S | 9/2007 | Shih et al. | |
| D565,555 S | 4/2008 | Goto | |
| D568,299 S | 5/2008 | Tuli | |
| D571,790 S | 6/2008 | Yoshitake et al. | |
| D577,721 S | 9/2008 | O'Neil | |
| D585,052 S | 1/2009 | Mamane et al. | |
| D589,496 S | 3/2009 | Legrand | |
| D602,473 S | 10/2009 | Moller et al. | |
| D606,520 S | 12/2009 | McRae et al. | |
| D609,222 S | 2/2010 | Shin | |
| D611,456 S | 3/2010 | Lin | |
| D612,365 S | 3/2010 | Lin | |
| D613,272 S | 4/2010 | Painter | |
| D618,666 S | 6/2010 | Shin et al. | |
| 2002/0149509 A1* | 10/2002 | Kim et al. | 341/176 |
| 2003/0016417 A1* | 1/2003 | Lee | 359/142 |
| 2003/0112221 A1* | 6/2003 | Kuan | G06F 3/0317 345/157 |
| 2003/0184520 A1* | 10/2003 | Wei | 345/163 |
| 2004/0130531 A1* | 7/2004 | Cheng | 345/163 |
| 2004/0233167 A1* | 11/2004 | Braun | A63F 13/06 345/163 |
| 2005/0078087 A1* | 4/2005 | Gates et al. | 345/163 |
| 2005/0128180 A1* | 6/2005 | Wang | G06F 3/0231 345/156 |
| 2005/0146497 A1* | 7/2005 | Clapper | 345/156 |
| 2005/0162569 A1* | 7/2005 | Fairhurst et al. | 348/734 |
| 2006/0012567 A1* | 1/2006 | Sicklinger | G06F 3/014 345/157 |
| 2006/0152491 A1* | 7/2006 | Lian | G06F 3/0346 345/166 |
| 2006/0192758 A1* | 8/2006 | Lu | 345/163 |
| 2006/0232550 A1* | 10/2006 | Buckner | 345/156 |
| 2007/0052674 A1* | 3/2007 | Culver | G06F 3/016 345/157 |
| 2007/0132733 A1* | 6/2007 | Ram | G06F 3/0227 345/163 |
| 2007/0268250 A1* | 11/2007 | Min | 345/158 |
| 2008/0278445 A1* | 11/2008 | Sweetser | G06F 3/0346 345/158 |
| 2008/0284735 A1* | 11/2008 | Shim | 345/166 |
| 2009/0027335 A1* | 1/2009 | Ye | G06F 3/017 345/158 |
| 2009/0179869 A1* | 7/2009 | Slotznick | G06F 3/0202 345/173 |
| 2009/0201248 A1* | 8/2009 | Negulescu | G06F 3/016 345/157 |
| 2009/0231275 A1* | 9/2009 | Odgers | G06F 1/162 345/157 |
| 2009/0295713 A1* | 12/2009 | Piot | G06F 3/0346 345/156 |
| 2010/0265179 A1* | 10/2010 | Ram | G06F 3/0227 345/163 |
| 2011/0279223 A1* | 11/2011 | Hatambeiki et al. | 340/4.3 |
| 2011/0304542 A1 | 12/2011 | Calderon | |
| 2013/0194183 A1* | 8/2013 | Odgers | G06F 1/162 345/158 |
| 2015/0193023 A1* | 7/2015 | Odgers | G06F 3/03543 345/163 |
| 2016/0004310 A1* | 1/2016 | Braun | G06F 3/016 345/156 |

OTHER PUBLICATIONS

PCT/US2011/043870 International Preliminary Report on Patentability mailed Jan. 24, 2013 (6 pp).
Extended European Search Report for EP 11807459.0/2594084 mailed Jan. 8, 2014; 8 pages.
Canadian first Official Action for corresponding Canadian Application 2,804,886, mailed Jun. 6, 2014 (6 pages).
First Office Action Issued by State Intellectual Property Office for Chinese Application 201180034369.9 (Translation); issued Nov. 26, 2014; 14 pages.

* cited by examiner

SYSTEMS AND METHODS FOR DUAL USE REMOTE-CONTROL DEVICES

TECHNICAL FIELD

The technical field relates to remote-control devices, and more particularly, to apparatuses, systems and methods for a dual use remote-control device having a sensor to control cursor movement on a display.

BRIEF SUMMARY

In one embodiment, a remote-control device is provided. In this embodiment, the remote-control device includes a remote-control device housing with controls on both sides of the housing. On one side of the housing there may be various buttons to control operations of a television or other media device while on the other side is an optical sensor or other sensor to control cursor movement on a television or other display. In a first mode, the optical sensor may be slid across an object such as, for example, a table, couch or user's lap to control the cursor movement. In a second mode, a user may move their finger across the optical sensor to control the cursor movement. There may also be a QWERTY keyboard on the same side of the remote-control device as the optical sensor for textual input. The remote control device may have a switch coupled to a system control module of the device to switch the remote-control device between modes, either automatically or manually. While in the first mode, a user may push a button on a different side of the device than the optical sensor to select an item on the display with the cursor. In the second mode, a user may push the optical sensor itself to select an item with the cursor.

In another embodiment, a method for controlling operation of a remote-control device is provided. The method includes receiving a mode input signal indicating that the remote-control device is in a first mode or second mode. Then particular controls on either side of the remote-control device may be activated or deactivated based on the mode input signal received. The optical sensor of the remote-control device may also be automatically adjusted accordingly to better detect movement of a finger across the optical sensor to control a cursor versus movement of the optical sensor over an object such as a table, couch or user's lap to control the cursor movement.

In another embodiment, a computer-readable storage medium is provided, the computer-readable storage medium having computer executable instructions thereon, that when executed by a computer processor cause a method similar to that above to be performed.

BRIEF DESCRIPTION OF THE DRAWINGS

The components in the drawings are not necessarily to scale relative to each other. Like reference numerals designate corresponding parts throughout the several views.

DETAILED DESCRIPTION

A. Environment Overview

Figure 1:
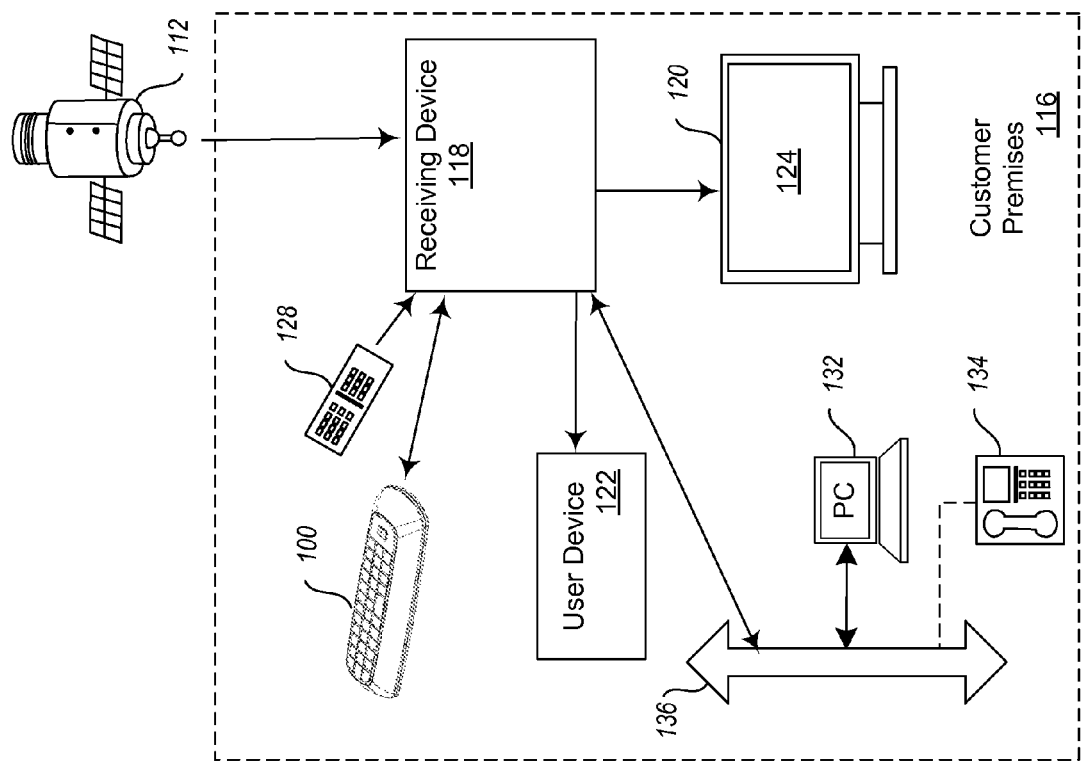
FIG. 1 is a block diagram illustrating an example environment in which various embodiments of a dual use remote may be implemented.

FIG. 1 is an overview block diagram illustrating an example environment in which various embodiments of a dual use remote-control device ("dual use remote") 100 may be implemented. It is to be appreciated that FIG. 1 illustrates just one example of a customer premises 116 environment and that the various embodiments discussed herein are not limited to use of such systems. Customer premises 116 can include a variety of communication systems and can use a variety of communication devices, presentation devices and media including, but not limited to, satellite wireless media.

Audio, video, and/or data service providers, such as, but not limited to, television service providers, provide their customers a multitude of audio/video and/or data programming (hereafter, collectively and/or exclusively "programming"). Such programming is often provided by use of a receiving device 118 communicatively coupled to a presentation device 120 configured to receive the programming.

Receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or other sources. Based upon selection by the user, the receiving device 118 processes and communicates the selected programming to the one or more presentation devices 120.

For convenience, the receiving device 118 may be interchangeably referred to as a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive programming. Further, the receiving device 118 may itself include user interface devices, such as buttons or switches. In many applications, a remote-control device ("remote") 128 is operable to control the presentation device 120 and other user devices 122.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display 124, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In at least one embodiment, the received program content is communicated (i.e., "uplinked") to one or more satellites 112. It is to be appreciated that the communicated uplink signal may contain a plurality of multiplexed programs. The uplink signal is received by the satellite 112 and then communicated (i.e., "downlinked") from the satellite 112 in one or more directions, for example, onto a predefined portion of the planet. It is appreciated that the format of the above-described signals are adapted as necessary during the various stages of communication.

The signal may be received by a receiving device 118. The receiving device 118 is a conversion device that converts, also referred to as formatting, the received signal into a signal suitable for communication to a presentation device 120 and/or a user device 122. The received signal communicated to the receiving device 118 is a relatively weak signal that is amplified, and processed or formatted, by the receiving device 118. The amplified and processed signal is then communicated from the receiving device 118 to a presentation device 120 in a suitable format, such as a television ("TV") or the like, and/or to a user device 122. It is to be appreciated that presentation device 120 may be any suitable device operable to present a program having video information and/or audio information.

User device 122 may be any suitable device that is operable to receive a signal from the receiving device 118, another endpoint device, or from other devices external to the customer premises 116. Additional non-limiting examples of user device 122 include optical media recorders, such as a compact disk ("CD") recorder, a digital versatile disc or digital video disc ("DVD") recorder, a digital video recorder ("DVR"), or a personal video recorder ("PVR"). User device 122 may also include game devices, magnetic tape type recorders, RF transceivers, personal computers ("PCs"), and personal mobile computing devices such as cell phones or personal digital assistants (PDAs).

An interface between the receiving device 118 and a user (not shown) may be provided by a hand-held remote-control device 128. Remote 128 typically communicates with the receiving device 118 using a suitable wireless medium, such as infrared ("IR"), radio frequency ("RF"), or the like. Other devices (not shown) may also be communicatively coupled to the receiving device 118 so as to provide user instructions. Non-limiting examples include game device controllers, keyboards, pointing devices, and the like.

The receiving device 118 may receive programming partially from, or entirely from, another source other than that described above. Other embodiments of the receiving device 118 may receive locally broadcast RF signals, or may be coupled to communication system 108 via any suitable medium. Non-limiting examples of medium communicatively coupling the receiving device 118 to communication system 108 include cable, fiber optic, or Internet media.

Customer premises 116 may include other devices which are communicatively coupled to communication system 108 via a suitable media. For example, but not limited to, some customer premises 116 include an optional network 136, or a networked system, to which receiving devices 118, presentation devices 120, and/or a variety of user devices 122 can be coupled, collectively referred to as endpoint devices. Non-limiting examples of network 136 include, but are not limited to, an Ethernet, twisted pair Ethernet, an intranet, a local area network ("LAN") system, or the like. One or more endpoint devices, such as PCs (e.g., PC 132), data storage devices, TVs, game systems, sound system receivers, Internet connection devices, digital subscriber loop ("DSL") devices, wireless LAN, WiFi, Worldwide Interoperability for Microwave Access ("WiMax"), or the like, are communicatively coupled to network 136 so that the plurality of endpoint devices are communicatively coupled together. Thus, the network 136 allows the interconnected endpoint devices, and the receiving device 118, to communicate with each other. Alternatively, or in addition, some devices in the customer premises 116 may be directly connected to the network 136, such as the telephone 134 which may employ a hardwire connection or an RF signal for coupling to network 136, which may also connect to other networks or communications systems outside customer premises 116.

Embodiments of the dual use remote-control device ("dual use remote") 100 are operable to control the presentation device 120 and possibly also other media devices. Examples of other media devices include the receiving device 118, the presentation device 124, the user device 122, the PC 132, the remote-control device 128, and the like.

In the one embodiment, the dual use remote 100 includes a keypad on the top side and at least one sensor on the bottom side to control cursor movement on the display 124 of the presentation device 120, and possibly also on a display of the user device 122, the PC 132, and/or other media devices. The dual use remote 100 may also include a partial, full or extended QWERTY keyboard on the bottom side to provide expanded text input capabilities. The dual use remote 100 may be configured to transmit to and receive commands from a media device. The command is typically based at least in part on a user input received via the keypad, keyboard, or sensor of the dual use remote 100. For example, by pressing the appropriate button on the keypad of the dual use remote 100 or by using the sensor on the dual use remote 100 to control a cursor to select a particular image on the display 124, a user may indicate that they wish to select a particular menu item of the receiving device 118 and/or its associated presentation device 120. In response, the dual use remote 100 or receiving device 118 sends the appropriate command to the receiving device 118 or presentation device 120. Other types of commands may be sent in addition to, or instead of, a menu selection. For example, device control/function commands, such as program selection, audio adjustment, picture adjustment, web browser control, window control, dialogue box control, text input, and the like, may also be sent.

The dual use remote 100 may also receive from the media device an indication of whether use of the sensor to control a cursor is appropriate depending on what type of command is sent or what type of menu system or navigation control is currently being used or activated on the display 124 or display of another media device, thus enabling the dual use remote to determine whether to be in a mode that enables use of the sensor to control a cursor and whether to enable and/or disable other functionality of the dual use remote 100.

In some embodiments, the dual use remote 100 is also configured to establish a master-slave relationship between the dual use remote 100 and one or more media devices, by making the dual use remote 100 operable to control the one or more media devices. For example, the dual use remote 100 can be used to identify itself as a master remote with respect to one or more other remote-control devices and/or receiving devices 118, including being operable to control a cursor and/or keyboard input on the PC 132. In this manner, the dual use remote 100 can be used to control other media devices.

The above description of the customer premises 116, and the various devices therein, is intended as a broad, non-limiting overview of an example environment in which various embodiments of a dual use remote may be implemented. The customer premises 116 and the various devices therein, may contain other devices, systems and/or media not specifically described herein.

Example embodiments described herein provide applications, tools, data structures and other support to implement a dual use remote that controls one or more media devices. Other embodiments of the described techniques may be used for other purposes, including for discovery and control of remote systems generally. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

B. Example Computing System Implementation

Figure 2:
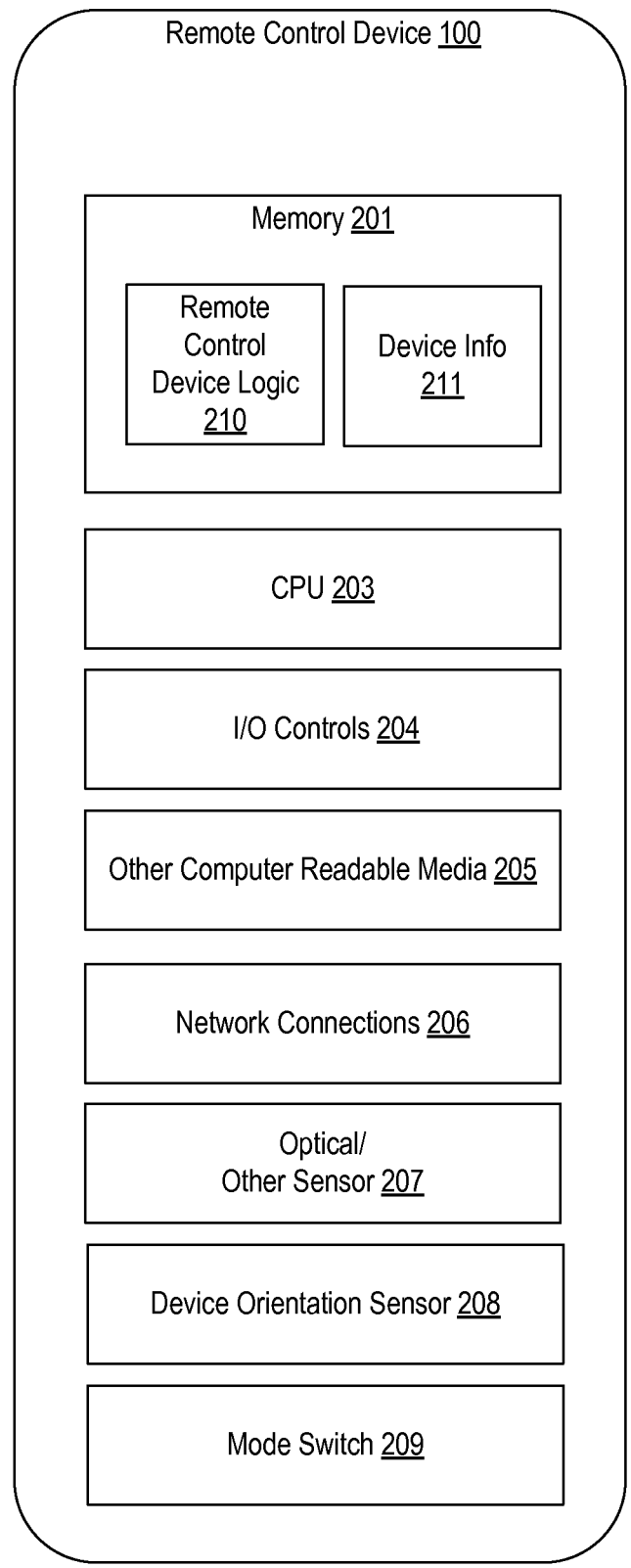
FIG. 2 is a block diagram illustrating components of an example embodiment of a dual use remote-control device.

FIG. 2 is a block diagram illustrating components of an example embodiment of a dual use remote-control device 100. Note that the components of the dual use remote 100 may be implemented in software, hardware, firmware, or in some combination to achieve the capabilities described herein.

In one embodiment, dual use remote 100 comprises a computer memory ("memory") 201, one or more Central Processing Units ("CPU") 203, Input/Output "I/O" controls 204 (e.g., keypad, QWERTY keyboard, etc.), other computer-readable media 205 (e.g., flash memory, SIM card), network connections 206, an optical or other sensor (e.g., scroll wheel input, touch pad, touch screen, optical sensor, track ball, joystick, etc.) 207, an optional device orientation sensor 208 (e.g., a sensor using a single or multi-axis accelerometer, gyro, mercury, etc.), and a mode switch 209. The mode switch 209 may be a manual switch, momentary switch, or a switch activated automatically by or integrated with the device orientation sensor 208 (e.g., a mercury switch, or switch activated by a multi-axis accelerometer or gyro). For example, the I/O controls 204 may include the keypad and the QWERTY keyboard with reference to FIGS. 3A through 3E and the optical/other sensor 207 may include the optical sensor 309 with reference to FIGS. 3A through 3E. In one embodiment, the optical sensor and QWERTY keyboard are positioned on the opposite side of the dual use remote 100 than the keypad. The network connections 406 include one or more communication interfaces to various media devices, including but not limited to radio frequency transceivers, infrared transceivers, wireless Ethernet ("Wi-Fi") interfaces, and the like. The one or more Central Processing Units ("CPU") 203 may be communicatively coupled to the memory 201 and the Input/Output controls 204, other computer-readable media 205, network connections 206, optical or other sensor 207, optional device orientation sensor 208, and mode switch 209 (e.g. via a communications bus) in a manner to control one or more operations of those various components.

The dual use remote 100 may communicate with receiving device 118, presentation device 124, and possibly other media devices such as the user device 122 and PC 132 shown in FIG. 1. Example media devices include other remote-control devices, video recorders, audio systems, displays, personal computers, set-top boxes, and the like. Other types of devices include control systems for home electromechanical systems, such as a lighting system, security system, climate control system, spa/pool, and the like.

Dual use remote-control device logic 210 and device information 211 is shown residing in memory 201. In other embodiments, some portion of the contents, some of, or all of the components of the logic 210 may be stored on the other computer-readable media 405. The logic 210 preferably executes on one or more CPUs 203 and manages the dual use remote 100, as described herein. The logic 210 may comprise or implement a system control module as executed by the on one or more CPUs 203 that are communicatively coupled to the I/O controls 204, optical/other sensor 207 and other components of the dual use remote 100. Other code or programs and potentially other data/information (not shown), may also reside in the memory 201, and preferably execute on one or more CPUs 203. Of note, one or more of the components in FIG. 4 may not be present in any specific implementation. For example, some embodiments may not provide other computer readable media 205.

Figure 4:
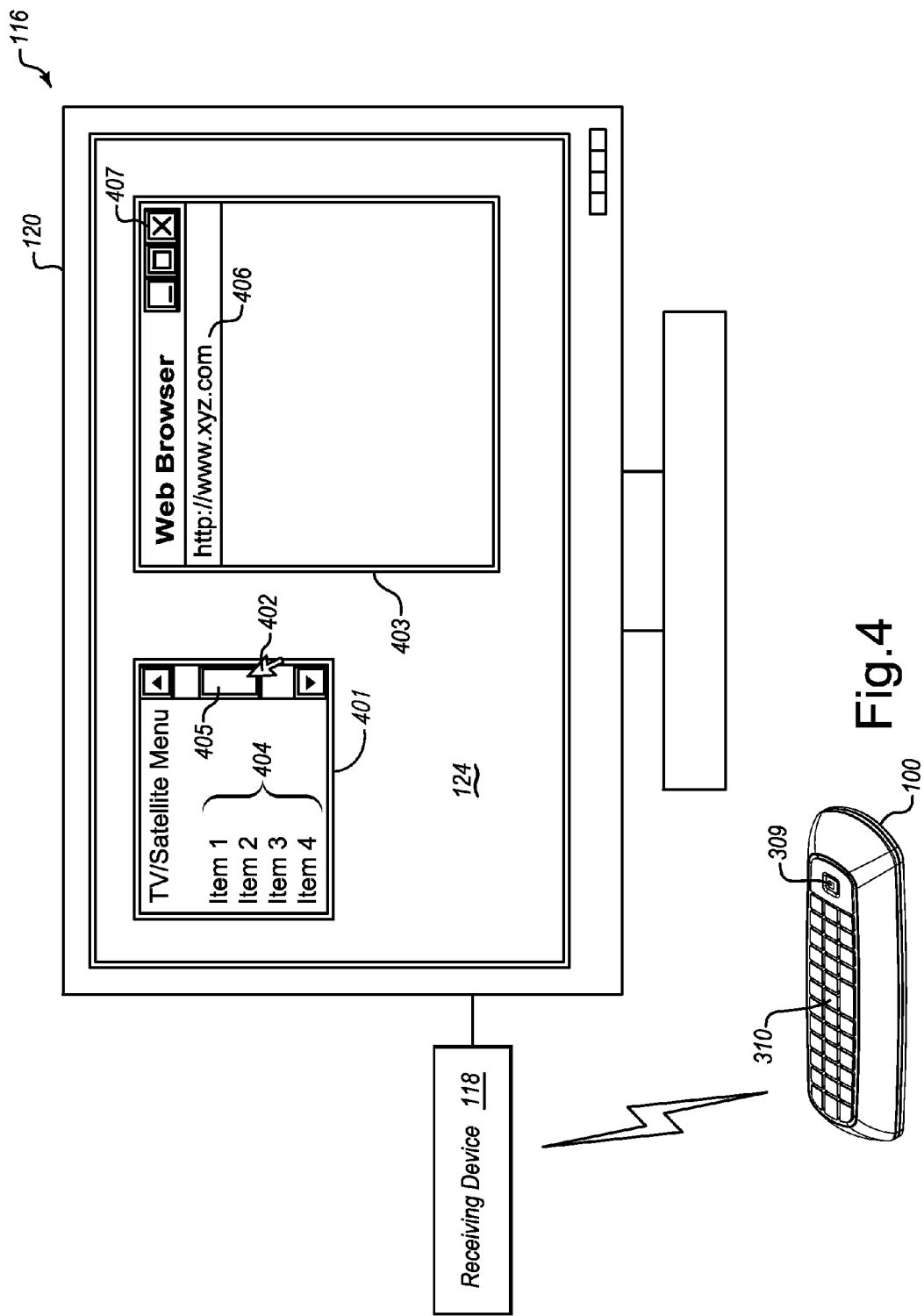
FIG. 4 is a block diagram illustrating an example embodiment of a dual use remote-control device in communication with a presentation device.
Figure 5:
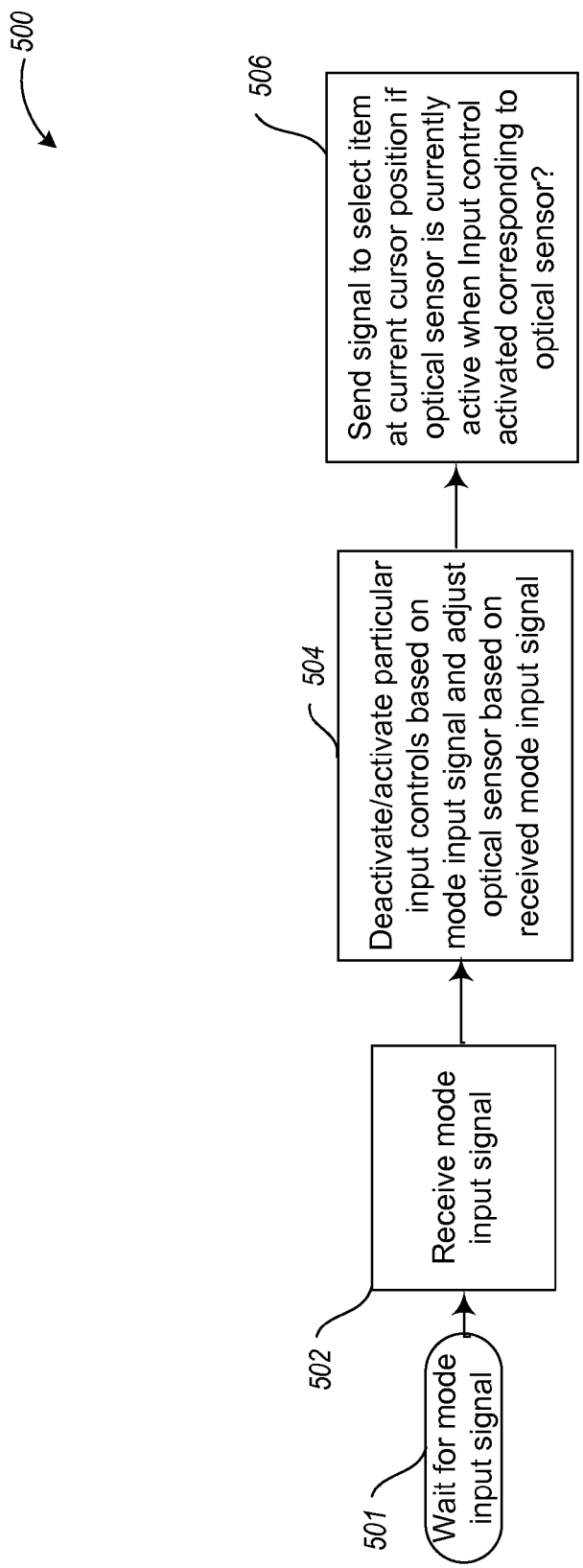
FIG. 5 is a flow diagram of an example dual use remote-control process provided by an example embodiment.
Figure 6:
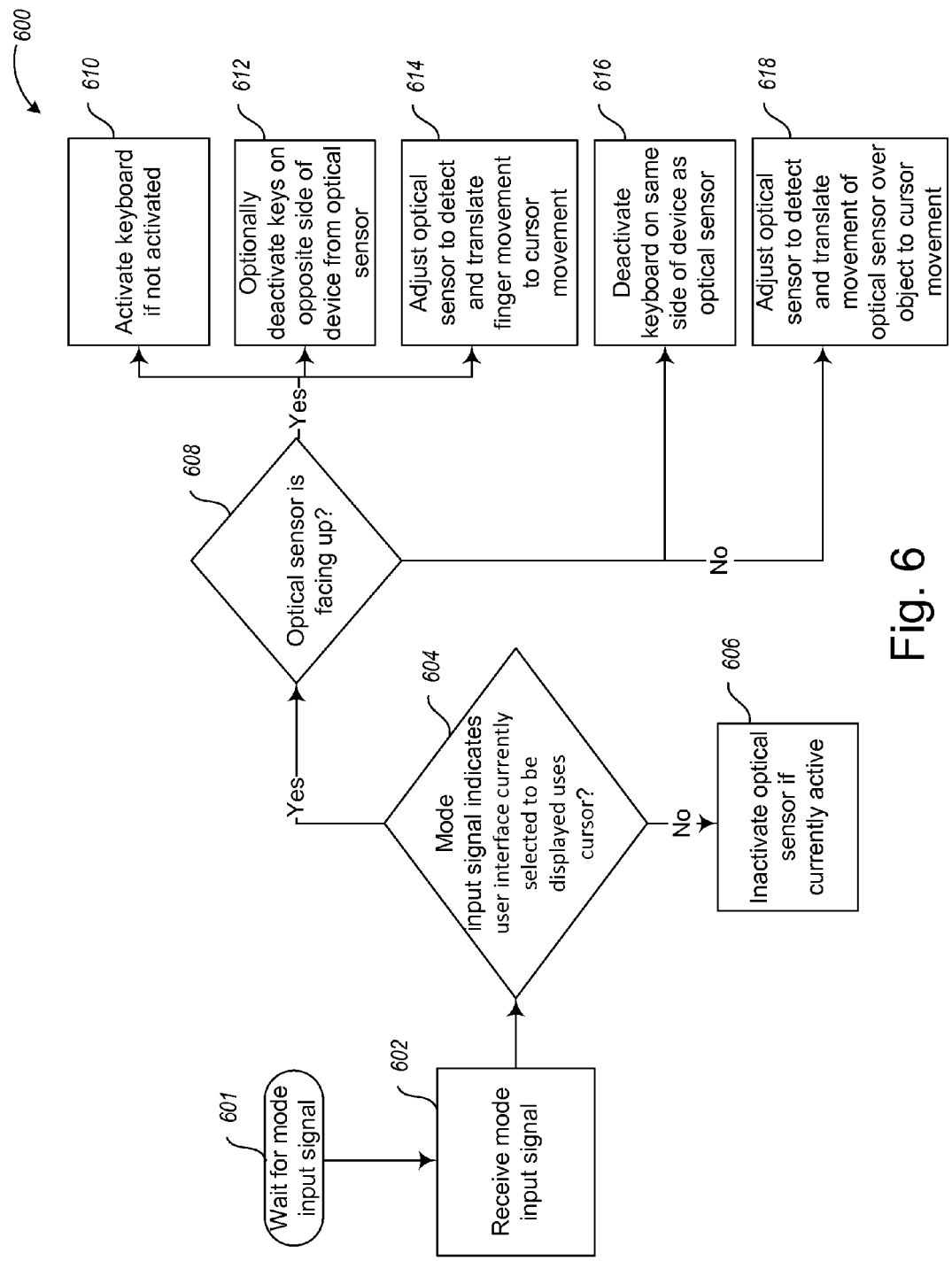
FIG. 6 is a flow diagram of an example dual use remote-control process including more detailed operations for switching modes provided by an example embodiment.

The logic 210 performs the core functions of the dual use remote 100, as discussed herein and also with respect to FIGS. 5 and 6. In particular, the logic 210 may control what mode the dual use remote-control 100 is in based on the state of the device orientation sensor 208, mode switch 209 or other variables. Also, the logic 210 may gather information about various media devices, such as receiving device 118, and store that information as device information 211 in order to determine a particular mode the dual use remote should be in when communicating with a particular device at a particular time depending on the information gathered. In one embodiment, the logic 210 receives a mode input signal and adjusts, enables, or disables particular I/O controls 204 and/or the optical/other sensor 207 accordingly. For example, if the dual use remote 100 is turned over such that the optical/other sensor 207 is facing down, the logic 210 may disable a QWERTY keyboard positioned on the same side as the optical/other sensor 207, adjust the optical/other sensor 207 to detect movement of the optical/other sensor 207 across an object (e.g., a user's lap) to wirelessly control the cursor on the display 124 (shown in FIGS. 1 and 4) based on the detected movement of the optical/other sensor 207 across the object. The logic 210 may also enable a particular I/O control of the I/O controls 204 positioned on the opposite side of the dual use remote 100 to act as the selection key, which when activated (e.g., pressed), may cause a signal to be wirelessly sent to select an item displayed on the display 124 at the current position of the cursor. Accordingly, when the dual use remote 100 is turned over such that the optical/other sensor 207 is facing up, the logic 210 may enable or activate the QWERTY keyboard positioned on the same side as the optical/other sensor 207, adjust the optical/other sensor 207 to better detect movement of a finger across the optical/other sensor 207 to wirelessly control the cursor on the display 124 based on the detected movement of the finger across the optical sensor, and enable the optical/other sensor 207 or a particular I/O control of the I/O controls 204 that is positioned on the same side of the dual use remote 100 as the optical/other sensor 207 to act as the selection key, which when activated (e.g., pressed), may cause a signal to be wirelessly sent to select an item displayed on the display 124 at the current position of the cursor.

The logic 210 also manages master-slave relationships with other media devices. A network of master-slave relationships known to the dual use remote 100 is stored in device information 411. In addition, changes to various master-slave relationships are regulated by the logic 210, and may affect the current mode into which the logic 210 may put the dual use remote 100 according to the type of device or type of user interface of the device (e.g., whether the user interface of the device uses a cursor, text input, etc.).

In at least some embodiments, remote and/or programmatic access is provided to at least some of the functionality of the dual use remote 100. For example, the dual use remote 100 may provide to other media devices an application program interface ("API") that provides access to various functions of the dual use remote 100, including access to information stored by the dual use remote 100 (e.g., about other media devices), the master/slave status of the dual use remote 100, and the like. In this manner, the API may facilitate the development of third-party software, such as user interfaces, plug-ins, adapters (e.g., for integrating functions of the dual use remote 100 into various user interface applications on media devices and various desktop applications), and the like. For example, a particular media device may present a customized or different user interface based upon the functionality and capabilities of the dual use remote 100.

In an example embodiment, the logic 210 is implemented using standard programming techniques. For example, the logic 210 may be implemented as a "native" executable running on the CPU 203, along with one or more static or dynamic libraries. In other embodiments, the logic 210 may be implemented as instructions processed by a virtual machine that executes as some other program. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the dual use remote.

In addition, programming interfaces to the data stored as part of the device information 211, can be available by standard mechanisms such as through C, C++, C#, and Java APIs; libraries for accessing files, databases, or other data repositories; through scripting languages such as XML; or through Web servers, FTP servers, or other types of servers providing access to stored data. The device information 211 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of an HDM.

Furthermore, in some embodiments, some or all of the components/portions of the logic 210 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

C. Example Dual Use Remote Configuration

Figure 3A:
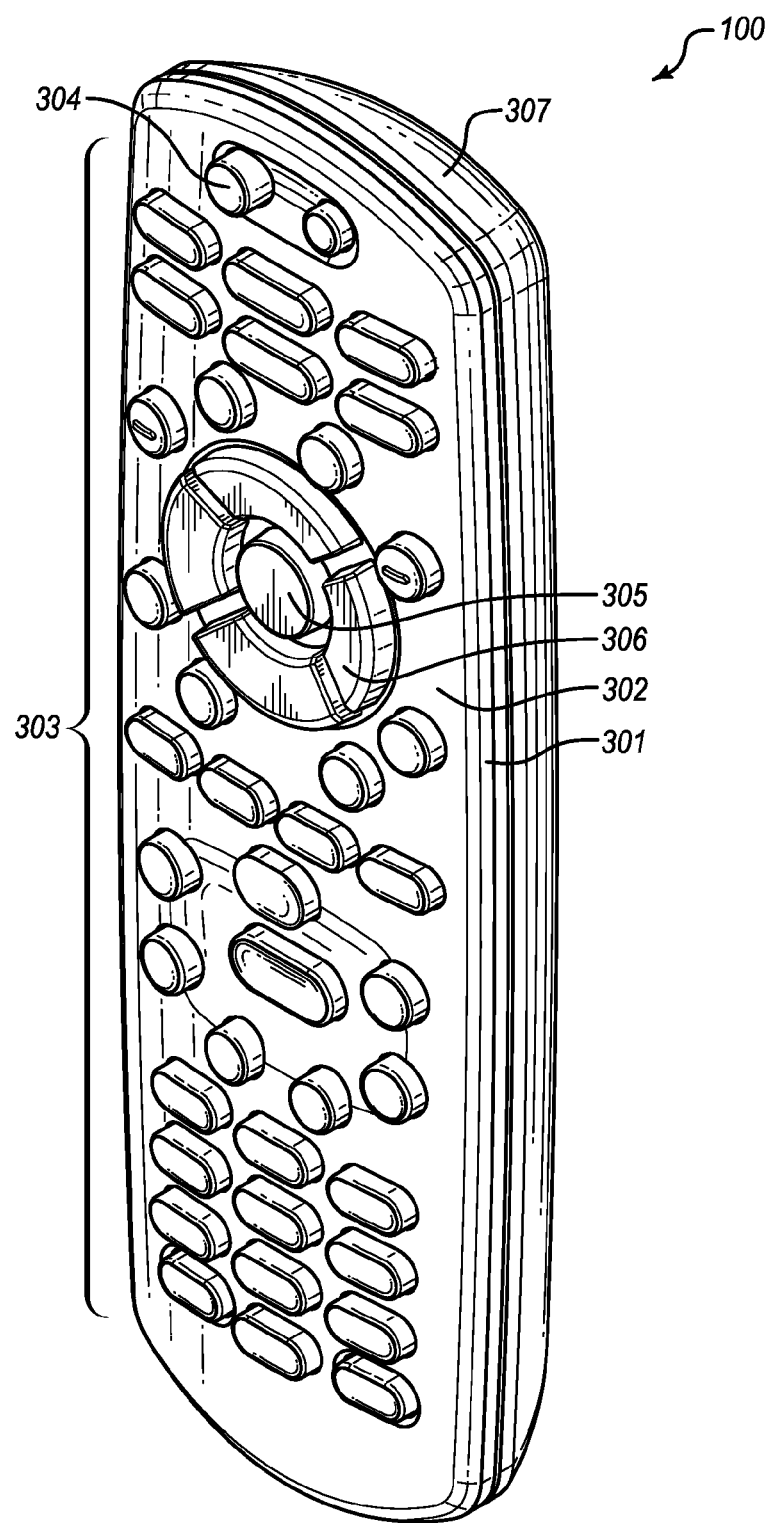
FIGS. 3A-3E are diagrams illustrating top perspective, top plan, side, bottom perspective, and bottom plan views, respectively, of an example embodiment of a dual use remote-control device.
Figure 3B:
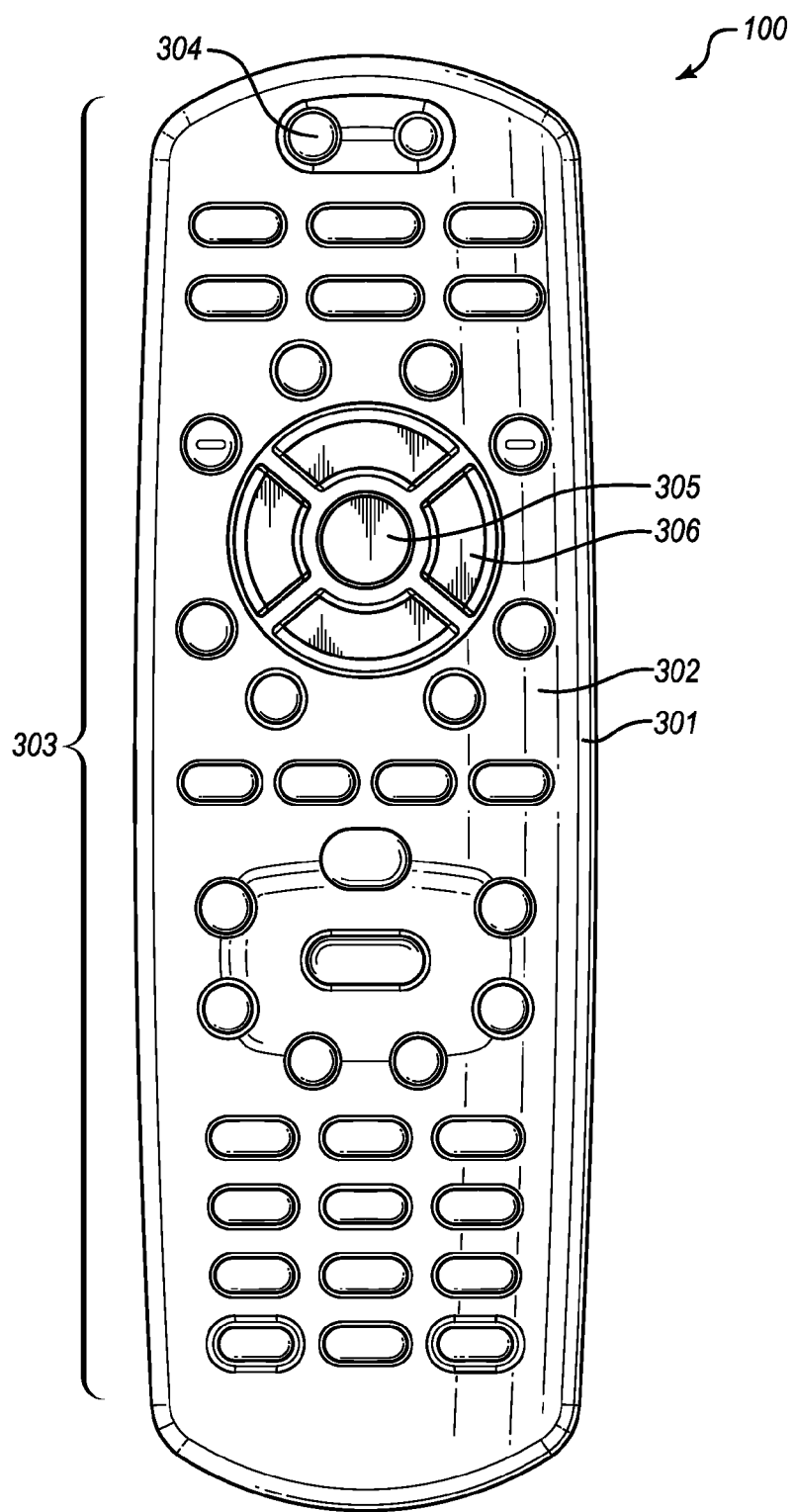

FIGS. 3A-3E are diagrams illustrating top perspective, top plan, side, bottom perspective, and bottom plan views, respectively, of an example embodiment of the dual use remote-control device 100. FIGS. 3A and 3B show the dual use remote-control device housing 301, a first set of input controls 303 on a top side 302 of the dual use remote 100, and a wireless transmitter/receiver 307 (shown in FIG. 3A). In the present example, the first set of input controls 303 includes a number of buttons positioned on the top side 302 of the dual use remote 100. The buttons may be configured to control a variety of operations for various media devices, the dual use remote 100 itself, and to navigate a variety of menus and user interfaces of the various media devices or dual use remote 100. These operations may include, but are not limited to channel selection, volume control, power, channel number input, fast forward, rewind, pause, and stop controls for video and audio devices, dual use remote mode switching, media device settings, on-demand services, purchase requests, and general menu and graphical user interface (GUI) navigation. For example, among other buttons, shown is a power button 304 and a selection button (i.e., "OK" or "Enter" button) 305 surrounded by corresponding directional menu navigation buttons including directional button 306. Other input controls may be positioned on the top side 302 and may comprise all or part of the first set of input controls 303 including, but not limited to, touch screens, touch pads, track balls, optical sensors, switches, and other touch-sensitive devices. The housing 301 may be made of any durable plastic or polymer material, or combination of materials, suitable for enclosing and protecting the internal electronics and power source of the dual use remote 100. The dimensions and overall shape of the housing 301 may vary depending on the positioning and placement of the first set of input controls 303, the positioning of the particular internal electronics of the dual use remote 100 components shown in FIG. 2, and any modifications for ease and comfort of use of the dual use remote 100.

Figure 3C:
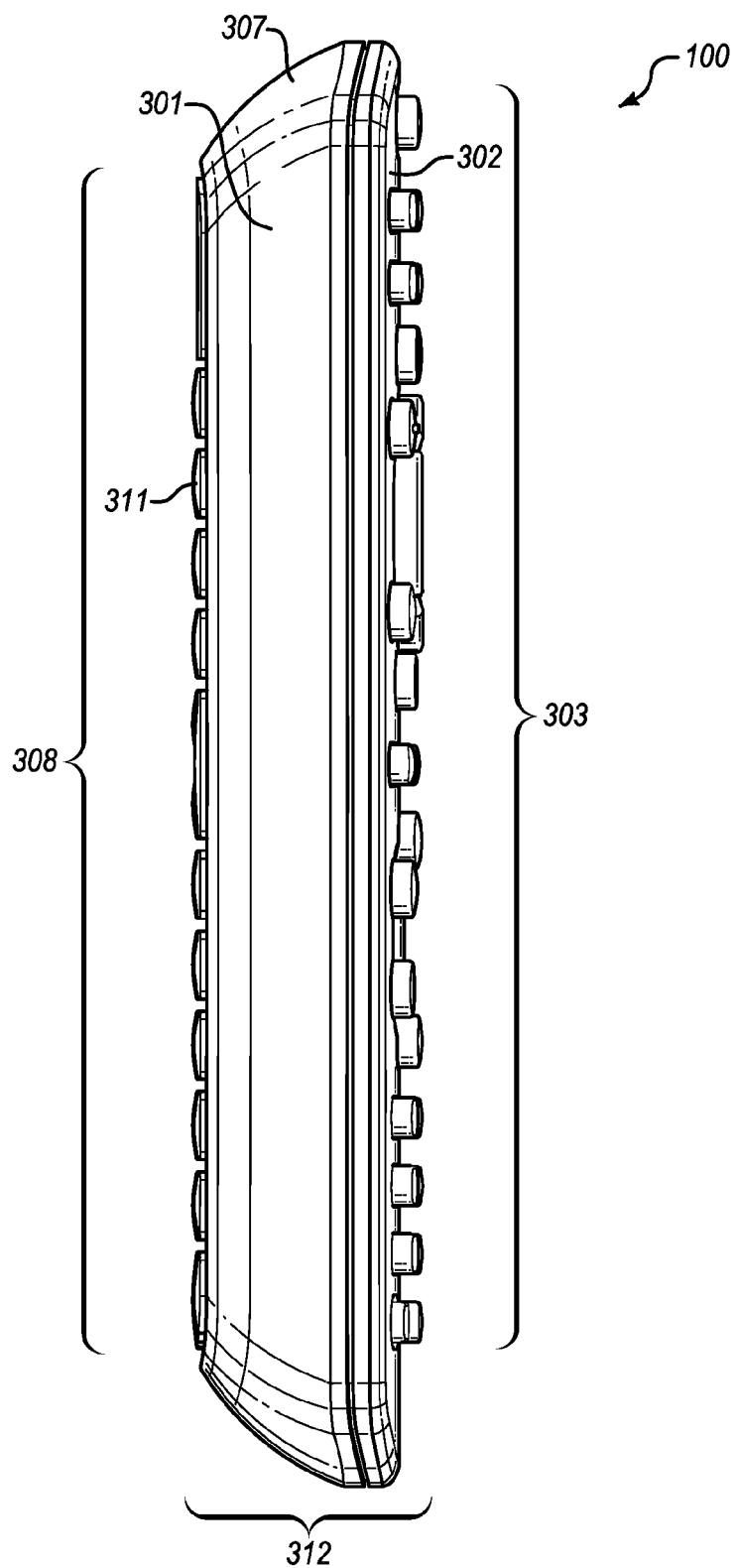
Figure 3D:
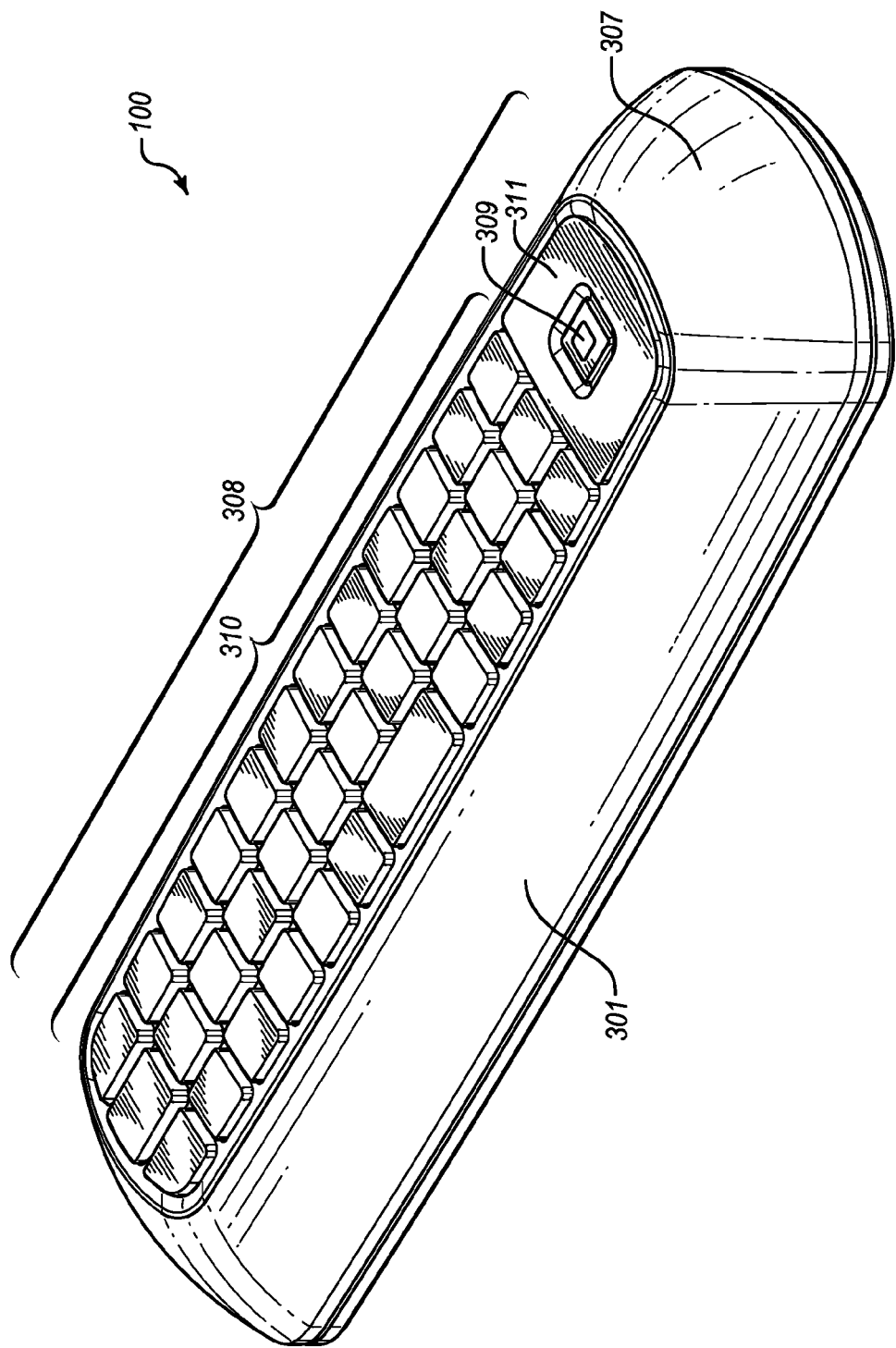
Figure 3E:
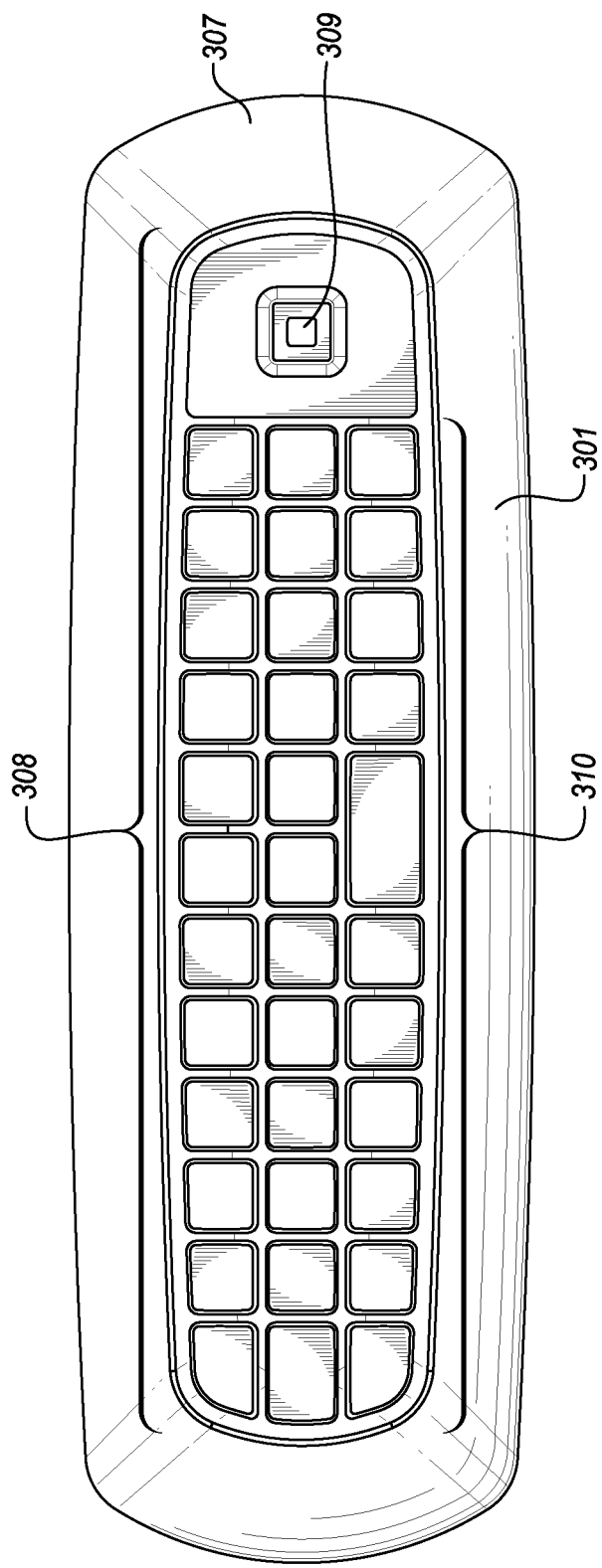

FIGS. 3C, 3D and 3E are diagrams illustrating side, bottom perspective, and bottom plan views, respectively, of the example embodiment of the dual use remote-control device 100. FIGS. 3C, 3D and 3E additionally show a second set of input controls 308 positioned on the bottom side 311 of the dual use remote 100 opposite the top side 302. FIG. 3C also shows an example thickness 312 of the dual use remote, which may vary depending on the positioning and type of internal electronics of the dual use remote 100, but in one example embodiment, is approximately 25 mm. As shown in FIG. 3C, the first set of input controls 303 and second set of input controls 308 may include buttons that extend slightly above the planar surface of the respective top side 302 and bottom side 311, respectively, on which they are positioned. Other configurations may include input controls that are substantially flush with the respective top side 302 and bottom side 311, respectively, on which they are positioned. However, if the second set of input controls 308 do include buttons that extend slightly above the planar surface of the bottom side 311 on which they are positioned, then the buttons of the second set of input controls 308 may be made of, painted, or finished with a material that enables the buttons to slide smoothly across an object. For example, such an object may be a table, couch, chair, or a user's lap. For example, the dual use remote 100 may be in a mode to control a cursor by sliding the optical sensor 309 (shown in FIGS. 3D and 3E), also located on the bottom side 308 of the dual use remote 100, across the object. Such material may include a smooth, hard plastic or hard rubber, or other suitable material instead of a soft rubber, rubberized or soft plastic material.

When the dual use remote 100 is in a mode to control the cursor by sliding the optical sensor 309 (shown in FIGS. 3D and 3E) located on the bottom side 311 of the dual use remote 100 across an object, there may be a particular input control of the first set of input controls 303 located on the top side 303 that is activated or enabled to be used as a selection control to select an item at the current position of the cursor on the display. For example, this particular input control used as the selection control when the dual use remote is being used in such a mode may be the select button 305. However, other input controls of the first set of input controls on the top side 302, or other input controls located on a side of the dual use remote 100 may also or alternatively be used as a select control or select button.

FIG. 3D shows a sensor 309 (in the present example, an optical sensor) and a QWERTY keyboard 310 included in the second set of input controls 308 positioned on the bottom side 311 of the dual use remote 100. The optical sensor 309 may be any optical sensor suitable for detecting finger movement across the optical sensor 309 and movement of the optical sensor 309 across an object such as a table, couch, chair or user's lap. For example, such optical sensors are available from Avago Technologies, having a headquarters in San Jose, Calif. Under control of the dual use remote-control device logic 210 (shown in FIG. 2), the optical sensor 309 may be operable and configured to enable wireless control of a cursor on a display (e.g., a television monitor) based on the detected movement of a finger across the optical sensor 309 or based on the detected movement of the optical sensor 309 across the object. As shown in FIGS. 3D and 3E, the optical sensor 309 may be configured to send a signal to select a particular item on a display at a current location of the cursor on the display when a user pushes on the optical sensor 309, thus activating a button mechanism to which the optical sensor 309 may be coupled in order to activate the selection signal. Also, or alternatively, there may be a particular input control of the second set of input controls 308 on the back side 311, side, or end of the dual use remote housing 301 such as a select button, enter button, or the like, that when pressed, signals to select a particular item on a display at a current location of the cursor on the display. The optical sensor 309 may be flush or slightly recessed from the planar surface of the back side 311 of the dual use remote 100. However, other configurations and locations of the optical sensor 309 may be used such that the distance between the optical sensor 309 and an object over which it is being passed is sufficient for the optical sensor 309 to detect movement of the optical sensor 309 over the object.

The optical sensor 309 may be positioned anywhere the bottom side 311, end or side of the dual use remote housing 301. However, if the QWERTY keyboard 310 is also included in the second set of input controls 308, the optical sensor 311 may be positioned in an area on the bottom side 311, end or side of the dual use remote housing 301 that does not substantially interfere with use of the QWERTY keyboard 310. Also, the optical sensor 309 may be positioned in the general area of the top end of the dual use remote 100 as shown in FIG. 3, the top end being that which faces upward or away from the user while the dual use remote 100 is oriented by a user to read button labels on the top side 302 of the dual use remote 100. The optical sensor 309 is shown positioned on the right-hand side of the QWERTY keyboard 310 in FIGS. 3D and 3E. However, the optical sensor 309 may alternatively be positioned on the left-hand side of the QWERTY keyboard 310, as may be preferable for left-handed users.

FIGS. 3D and 3E show a full QWERTY keyboard 310 positioned on the bottom side 311. However, limited or extended QWERTY keyboards, other keyboard or keypad configurations, or no keyboard or other input controls on the bottom side may be included in alternative embodiments. The QWERTY keyboard 310 is configured and operable to allow a user to enter or communicate text input to the dual use remote 100 and/or various media devices with which the dual use remote 100 may be in communication while also use the optical sensor 309 to control movement of a cursor or other graphical object on a display of a device with which the dual use remote 100 is in communication. Included in the QWERTY keyboard 310 may be individual buttons corresponding to each letter of the English alphabet and a space bar. Other buttons or keys of the QWERTY keyboard 310 may include, but are not limited to: enter, shift, backspace, numbers, tab, control, alt, caps lock, special symbols, punctuation marks, direction keys, function keys, customized keys, 10-key keypad, number lock, etc. Also, other keys of the QWERTY keyboard may correspond to characters of other languages than English. Also included on the top, bottom, sides or ends of the dual use remote 100 may be various other controls and/or switches (not shown) to control operations and modes of the dual use remote 100 or operations of other media devices with which the dual use remote 100 may be in communication.

D. Example Dual Use Remote Functionality

FIG. 4 is a block diagram illustrating an example embodiment of a dual use remote-control device 100 in communication with a presentation device 120. In particular, FIG. 4 shows an example dual use remote 100 operating in customer premises 116. The customer premises 116 includes a dual use remote 100, receiving device 118, and presentation device 120 having a display 124. On the display 124, are shown example user interfaces and applications. In particular, an example TV/Satellite menu 401, a cursor 402, and an example web browser 403 are shown. The TV/Satellite menu 401 may have various controls and menus with which the cursor 402 interacts to select particular menu items 404. For example, shown is a slider bar 405, to enable a user to scroll through particular example menu items 404 (four of which are shown). Also, the web browser 407 may include various menu items and controls that interact with the same cursor 402 and also receive input from the QWERTY keyboard 310 of the dual use remote 100 through the receiving device 118. For example, shown are window controls 407 to minimize, maximize or close the GUI window of the web browser 403 when selected using the cursor 402. Also, text may be input at the address bar 406 of the web browser 403 using the QWERTY keyboard 310 of the dual use remote 100. For example, a user may enter text into a web browser 403 being displayed on a user's television using the QWERTY keyboard 310 and use the optical sensor 309 to control a cursor and select items on a particular web site displayed within the web browser 403.

Other menus, interfaces and applications may be displayed and controlled using the optical sensor 309 to control movement of the cursor 402 and/or using the QWERTY keyboard 310 to enter text or other input into the various menus, interfaces and applications in communication with the presentation device 120 and/or the receiving device 118. Examples of such other menus, interfaces and applications include, but are not limited to, menus, interfaces and applications of: televisions, satellite and cable receivers, DVD players, game consoles, computers, and computer networks. Other such examples include digital video or audio recorders or players, analog video or audio recorders or players, stereo equipment, home appliances, mobile devices, MP3 players, cellular phones, home entertainment systems, home theater systems, smart home systems, home electromechanical systems, such as a lighting system, security system, climate control system, spa/pool, and the like, or other media devices, etc.

In the present example, receiving device 118 is a set-top box coupled to presentation device 120. The dual use remote 100 may wirelessly communicate and receive information to and from the receiving device 118 and also possibly other devices (not shown) on the customer premises 116. This information communicated to the receiving device 118 is communicated to presentation device 120 in order to provide various input to control the presentation device or other devices or applications in communication with the presentation device and/or receiving device 118. In some embodiments, the receiving device 118 and presentation device 120 may be integrated into one device.

The dual use remote 100 may operate in a number of different modes, each mode corresponding to a particular physical orientation, switch position, current menu or interface selected, current device being communicated with, or a combination of the foregoing items. For example, when the dual use remote 100 is oriented such that the side having the optical sensor 309 is facing upward, the device may change modes causing the settings of the optical sensor 309 to be adjusted to better detect movement of a finger across the optical sensor 309 and/or causing the first set of input controls on the opposite side of the dual use remote 100 to be disabled. Other automatic adjustments may include, transposing, when the dual use remote 100 changes between modes (e.g., as indicated by a mode input signal), at least a portion of a coordinate system used to translate movement detected by the optical sensor to movement of the cursor 402. For example, what were previously up and down motions as detected by the optical sensor 309 in one mode may be transposed to left and right, respectively, and vice versa. The QWERTY keyboard 310 may also be disabled when facing downward such that the keys on the keyboard 310 are not inadvertently pressed when moving the dual use remote 100 over objects such as tables, couches, chars, a user's lap, etc. The QWERTY keyboard 310 may again be automatically enabled when facing upward.

Also, the sensitivity of the optical sensor 309 and/or a scale used in translating a distance of movement detected by the optical sensor 309 to movement of the cursor 402, and other calibrations, may be automatically adjusted depending on what mode the dual use remote 100 is in. For example, when the dual use remote 100 is oriented such that the side having the optical sensor 309 is facing upward, a scale is adjusted such that a movement by the optical sensor 309 of a certain distance results in larger movement of the cursor 402 than a movement detected of the same distance when the dual use remote 100 is oriented such that the side having the optical sensor 309 is facing downward. This is due to the overall larger areas of movement detected by the optical sensor 309 when moving the optical sensor 309 over a table or user's lap than when moving a finger over the optical sensor 309 to control cursor movement in a different mode.

The current menu or device with which the dual use remote 100 is communicating may also affect the particular mode in which the dual use remote 100 is operating. This may be enabled by two-way communication between the dual use remote 100 and the particular device (e.g., presentation device 120 and/or receiving device 118). For example, when a user interface or menu system that accepts text input and/or uses the cursor 402 is entered, activated or displayed on the display 124, this may be communicated to the dual use remote 100 such that the dual use remote 100 may change modes, if needed, to activate and/or adjust the optical sensor 309, enable the QWERTY keyboard 310, and/or disable other keys or input controls as appropriate. For example, if a user opens a web browser 403 on their television or starts communicating with their computer using the dual use remote 100, this may result in a mode being entered by dual use remote 100 causing the QWERTY keyboard to be activated. The optical sensor is also activated and adjusted to better detect finger movement. The first set of input controls on the opposite side of the dual use remote 100 from the QWERTY keyboard and optical sensor 309 may also be temporarily disabled or deactivated while in such a mode.

In order to govern the access to various functions or modes of the dual use remote 100, such as a text entry mode or cursor control mode to surf the Internet, or to govern changing to particular channels or accessing particular types of content, various types of access controls may be employed. For example, one or more of the functions or modes of the dual use remote 100 may be password protected, such that the user must provide a password or other identifier (e.g., a PIN, biometric identifier, etc.) to access the protected functions or modes, or content.

E. Processes

FIG. 5 is a flow diagram of an example dual use remote-control process provided by an example embodiment. In particular, FIG. 5 illustrates process 500 that may be implemented, for example, by the logic 210 executing on the dual use remote 100, described with respect to FIG. 2.

The process 500 starts at 501 wherein the process waits for a mode input signal and then at 502 the process receives the mode input signal. As described above, the mode input signal may be a signal automatically received based on output of an orientation sensor indicating a physical orientation of the dual use remote, a manual switch on the dual use remote, information communicated to the dual use remote from a device it is controlling or with which it is communicating, or a combination of such items.

At 504, the process deactivates and/or activates particular input controls based on mode the input signal. For example, the process may activate or deactivate the optical sensor or keyboard or other input controls according to the particular mode indicated by the mode input signal. At this point, the process also adjusts the optical sensor based on the received mode input signal. For example, this adjustment may include sensitivity, scale and coordinate systems used by the optical sensor as well as other adjustments.

If it is determined that an input control was activated that corresponds to the optical sensor, then at 506 the process sends a signal to select the item at the current cursor position. For example, the dual use remote may have an input control such as a button that the user may press when the user desires to select an item at the current location of the cursor being controlled by the optical sensor. This, however, occurs when the dual use remote is in a mode in which the optical sensor is currently active.

FIG. 6 is a flow diagram of an example dual use remote-control process including more detailed operations for switching modes provided by an example embodiment.

The process 600 starts at 601 wherein the process waits for a mode input signal and then at 602 the process receives the mode input signal. As described above, the mode input signal may be a signal automatically received based on output of an orientation sensor indicating a physical orientation of the dual use remote, a manual switch on the dual use remote, information communicated to the dual use remote from a device it is controlling or with which it is communicating, or a combination of such items.

At 604, the process determines whether the mode input signal indicates the user interface currently selected to be displayed uses a cursor.

If it had been determined that the mode input signal indicated the user interface currently selected to be displayed does not use a cursor, then at 606 the optical sensor is deactivated if it is currently active and the process returns to 602.

If it had been determined that the mode input signal indicated the user interface currently selected to be displayed does use a cursor, then at 608, the process determines whether the optical sensor is facing up. For example, this may be determined by an indication by the input signal itself or other signals indicative of whether the optical sensor is facing up (e.g., an orientation sensor, manual switch, etc.).

If it had been determined that the optical sensor is facing up, then at 610, the QWERTY keyboard on the same side of the dual use remote as the optical sensor is activated or enabled if not already activated.

If it had been determined that the optical sensor is facing up, then at 612, the keys on the opposite side of device from the optical sensor are optionally deactivated or disabled. This option may be user selectable when initially configuring the dual use remote.

If it had been determined that the optical sensor is facing up, then at 614, the optical sensor may be adjusted to better detect and translate finger movement to cursor movement as described above.

If it had been determined that the optical sensor is not facing up, then at 616, the keyboard on the same side of the dual use remote as the optical sensor is deactivated or disabled. This option, among others, may also be user selectable during initial configuration of the dual use remote.

If it had been determined that the optical sensor is not facing up, then at 616, the optical sensor is also adjusted to better detect and translate movement of the optical sensor over an object to cursor movement on the display as described above.

Some embodiments perform one or more operations/aspects in addition to the ones described with respect to process 500 and process 600. For example, in various embodiments, the process 500 and process 600 or parts thereof, may automatically execute upon the occurrence of other events, such as a request received from a media device in which the dual use remote is in communication.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A remote-control device comprising:
    a remote-control device housing;
    a system control module within the housing;
    a first set of input controls positioned on a top side of the housing communicatively coupled to the system control module, wherein the first set of input controls are buttons and comprise television channel selection buttons, a power button and a select button;
    a second set of input controls positioned on a bottom side of the housing and communicatively coupled to the system control module, wherein the second set of input controls comprises a QWERTY keyboard and at least an optical sensor configured to wirelessly control movement of a cursor on a remote display, wherein the system control module is configured to disable the first set of input controls including the television channel selection buttons, the power button and the select button, when the bottom side is detected to be facing up; and
    a switch coupled to the system control module configured to switch the remote-control device from a first mode to a second mode wherein the optical sensor is configured to wirelessly control movement of the cursor on the display in the first mode by detecting movement of the optical sensor across an object and in the first mode the system control module is configured to select an item displayed on the display at a current position of the cursor when a particular input control of the first set of input controls is activated, and wherein the optical sensor is configured to wirelessly control movement of the cursor on the display in the second mode by detecting movement of a finger across the optical sensor and in the second mode the system control module is configured to select an item displayed on the display at a current position of the cursor when an input control of the second set of input controls is activated, wherein the system control module is further configured to:

receive an indication that a user interface on which the cursor is being displayed accepts text input; and in response to receiving the indication that the user interface on which the cursor is being displayed accepts text input;

enable the QWERTY keyboard included in the second set of input controls positioned on the bottom side of the housing;

disable the first set of input controls including the television channel selection buttons, the power button and the select button positioned on the top side of the housing;

configure the optical sensor to wirelessly control movement of the cursor on the display by detection of movement of a finger across the optical sensor; and select an item displayed on the display at a current position of the cursor when an input control of the second set of input controls positioned on the bottom side of the housing is activated.

2. The remote-control device of claim 1 wherein the input control of the second set of input controls that is pressed to select an item displayed on the display at a current position of the cursor is the optical sensor.

3. The remote-control device of claim 1 wherein the switch is configured to be automatically triggered on a particular movement of the remote-control device.

4. The remote-control device of claim 3 wherein the switch is configured to put the remote-control device in the second mode when the bottom side is detected to be facing up as indicated by the particular movement of the remote-control device.

5. The remote-control device of claim 1 wherein the system control module is configured to automatically disable the second set of input controls, except for the optical sensor, when the bottom side is detected to be facing down.

6. The remote-control device of claim 1 wherein the system control module is configured to transpose at least a portion of a coordinate system when the remote-control device changes between the first and second modes, said coordinate system used to translate movement detected by the optical sensor to movement of the cursor.

7. A remote-control device comprising:
a remote-control device housing;
a system control module within the housing;
a first set of input controls positioned on a top side of the housing communicatively coupled to the system control module, wherein the first set of input controls are buttons and comprise television channel selection buttons, a power button and a select button;

a second set of input controls positioned on a bottom side of the housing and communicatively coupled to the system control module, wherein the second set of input controls comprises a QWERTY keyboard and at least an optical sensor configured to wirelessly control movement of a cursor on a remote display wherein the system control module is configured to disable the first set of input controls including the television channel selection buttons, the power button and the select button, when the bottom side is detected to lie facing up; and a switch coupled to the system control module configured to switch the remote-control device from a first mode to a second mode wherein the optical sensor is configured to wirelessly control movement of the cursor on the display in the first mode by detecting movement of the optical sensor across an object and in the first mode the system control module is configured to select an item displayed on the display at a current position of the cursor when a particular input control of the first set of input controls is activated, and wherein the optical sensor is configured to wirelessly control movement of the cursor on the display in the second mode by detecting movement of a finger across the optical sensor and in the second mode the system control module is configured to select an item displayed on the display at a current position of the cursor when an input control of the second set of input controls is activated, wherein the system control module is configured to transpose at least a portion of a coordinate system when the remote-control device changes between the first and second modes, said coordinate system used to translate movement detected by the optical sensor to movement of the cursor and transpose the coordinate system used to translate movement detected by the optical sensor to movement of the cursor when the remote-control device changes between the first and second modes by being configured to transpose, in response to the remote-control device changing between the first and second modes, what were previously up and down motions as detected by the optical sensor to be left and right, respectively.

8. The remote-control device of claim 7 wherein the system control module is further configured to:

in response to the remote-control device being oriented with the bottom side having the optical sensor facing upward, adjust a scale used in translating a distance of movement detected by the optical sensor to movement of the cursor such that a movement detected by the optical sensor of a certain distance results in larger movement of the cursor than a movement detected of the same distance when the remote-control device is oriented with the bottom side having the optical sensor facing downward.

* * * * *

UNITED STATES PATENT AND TRADEMARK OFFICE
CERTIFICATE OF CORRECTION

PATENT NO. : 9,542,007 B2
APPLICATION NO. : 12/835403
DATED : January 10, 2017
INVENTOR(S) : Luke VanDuyn et al.

Page 1 of 1

It is certified that error appears in the above-identified patent and that said Letters Patent is hereby corrected as shown below:

In the Claims

Column 16, Line 6:
"movement of a cursor on a remote display wherein the" should read, --movement of a cursor on a remote display, wherein the--.

Column 16, Line 10:
"button, when the bottom side is detected to lie facing" should read, --button, when the bottom side is detected to be facing--.

Signed and Sealed this
Twentieth Day of February, 2018

Andrei Iancu
*Director of the United States Patent and Trademark Office*